United States Patent [19]

Miyawaki

[11] Patent Number: 4,651,595
[45] Date of Patent: Mar. 24, 1987

[54] KICKDOWN SYSTEM FOR AN INFINITELY VARIABLE TRANSMISSION

[75] Inventor: Motohisa Miyawaki, Chofu, Japan

[73] Assignee: Fuji Jukogyo Kabushiki Kaisha, Tokyo, Japan

[21] Appl. No.: 643,528

[22] Filed: Aug. 23, 1984

[30] Foreign Application Priority Data

Aug. 31, 1983 [JP] Japan .................................. 58-159481

[51] Int. Cl.⁴ .......................................... B60K 41/18
[52] U.S. Cl. .................................. 74/866; 74/870; 74/877; 474/12; 474/28
[58] Field of Search .................. 474/11, 12, 18, 19, 474/28, 70; 74/856, 857, 859, 860, 862, 865, 866, 867, 868, 870

[56] References Cited

U.S. PATENT DOCUMENTS

| | | | |
|---|---|---|---|
| 3,783,713 | 1/1974 | Will | 74/865 |
| 3,893,344 | 7/1975 | Dantlgraber et al. | 474/12 |
| 4,142,613 | 3/1979 | Iijima | 74/866 X |
| 4,152,947 | 5/1979 | Van Deursen et al. | 474/11 |
| 4,161,894 | 7/1979 | Giacosa | 474/12 |
| 4,369,675 | 1/1983 | Van Deursen | 74/864 |
| 4,369,676 | 1/1983 | Gaus | 74/865 X |
| 4,391,165 | 7/1983 | Gaus | 74/865 X |
| 4,400,164 | 8/1983 | Cadee | 474/12 |
| 4,458,560 | 7/1984 | Frank et al. | 74/865 X |
| 4,475,416 | 10/1984 | Underwood | 474/28 |
| 4,507,986 | 4/1985 | Okamura et al. | 74/859 X |
| 4,515,040 | 5/1985 | Takeuchi et al. | 74/860 X |
| 4,522,086 | 6/1985 | Haley | 74/870 X |
| 4,543,855 | 10/1985 | Oetting et al. | 74/877 |
| 4,546,673 | 10/1985 | Shigematsu et al. | 74/865 |
| 4,569,254 | 2/1986 | Itoh et al. | 74/866 |
| 4,572,031 | 2/1986 | Yokooku et al. | 74/866 |

FOREIGN PATENT DOCUMENTS

| | | | |
|---|---|---|---|
| 48404 | 4/1984 | Japan | 474/28 |
| 2058257 | 4/1981 | United Kingdom | 474/28 |
| 2129073 | 5/1984 | United Kingdom | 474/28 |

Primary Examiner—Leslie Braun
Assistant Examiner—Joseph M. Rolnicki
Attorney, Agent, or Firm—Martin A. Farber

[57] ABSTRACT

A kickdown system for an infinitely variable belt-drive transmission comprises a primary pulley having a hydraulically shiftable disc, a secondary pulley having a hydraulically shiftable disc, a belt engaged with both pulleys, and a hydraulic circuit having a pump for supplying oil. A transmission ratio control valve is provided to be responsive to engine speed for controlling the oil and for shifting the disc of the primary pulley to change the transmission ratio, and a pressure regulator valve is provided to respond to the transmission ratio for increasing the pressure of the oil with an increase of the transmission ratio. A kickdown switch is provided to produce a signal upon the full depression of an accelerator pedal of a vehicle. A solenoid device is responsive to the signal for operating the pressure regulator valve so as to increase the pressure of the oil, whereby the downshifting of transmission is enhanced.

8 Claims, 7 Drawing Figures

KICKDOWN SYSTEM FOR AN INFINITELY VARIABLE TRANSMISSION

BACKGROUND OF THE INVENTION

The present invention relates to a kickdown system for an infinitely variable belt-drive transmission for a vehicle. U.S. Pat. No. 4,369,675 discloses a control system for an infinitely variable transmission.

The infinitely variable belt-drive transmission comprises an endless belt running over a primary pulley and a secondary pulley. Each pulley comprises a movable conical disc which is axially moved by a fluid operated servo device so as to vary the running diameter of the belt on the pulley depending on driving conditions. The system is provided with an oil pressure regulator valve and a transmission ratio control valve. Each valve comprises a spool to control the oil by shifting the spool.

The primary pulley has a Pitot pressure generating device for producing Pitot pressure dependent on engine speed. The Pitot pressure is applied to one axial end of the spool of each valve to bias the spool. On the other hand, the actual transmission ratio is detected by the axial position of the movable conical disc of the primary pulley which represents the running diameter of the belt on the primary pulley. The position of the movable conical disc is transmitted to the other axial end of the spool of the pressure regulator valve by a rod and a link.

The spool of the transmission ratio control valve is shifted in dependency on the opening degree of a throttle valve of an engine and on engine speed to control the amount of oil supplied to the servo device of the primary pulley so as to control the transmission. The spool of the oil pressure regulator valve is shifted in dependency on the engine speed, the pressure in the servo device of the secondary pulley and on the transmission ratio to regulate the pressure of the line oil. Thus, the transmission ratio can be smoothly and infinitely varied.

In the system, when the accelerator pedal is fully depressed for kickdown, the transmission ratio control valve is operated in accordance with the full opening of the throttle valve so as to drain the oil in the servo device of the primary pulley, so that the transmission ratio is changed to a large ratio, that is a low speed state. The amount of shifting of the movable conical disc of the primary pulley is applied to the pressure regulator valve by the rod and link, so that the pressure of the line oil is increased to enhance the change-speed operation. However, the pressure regulating operation is the same as the operation at ordinary deceleration, and hence the kickdown is not quickly operated as described below.

The line oil pressure is determined by the relation between the Pitot pressure and the position of the rod dependent on the transmission ratio. On the other hand, since the engine speed increases, the Pitot pressure increases which acts to oppose the increase of the line oil pressure. FIG. 1 shows the relationship between the line oil pressure and the transmission ratio under the condition of a constant opening degree of the throttle valve. Accordingly, the line pressure does not rise quickly, and the response of the system to the kickdown operation is slow.

In order to improve the response of the system, two methods may be proposed. One of the methods is to quickly drain the oil in the servo device of the primary pulley, and the other is to increase the pressure in the servo device of the secondary pulley to a higher value than the ordinary deceleration. However, if the pressure in the servo device in the primary pulley quickly decreases, the belt tends to slip on the pulley.

SUMMARY OF THE INVENTION

The object of the present invention is to provide a kickdown system which quickly operates in response to the kickdown operation.

To this end, according to the present invention, there is provided a kickdown system for an infinitely variable transmission for transmitting the power of an internal combustion engine mounted on a vehicle, the transmission comprising a primary pulley having a hydraulically shiftable disc and a hydraulic cylinder for shifting the disc, a secondary pulley having a hydraulically shiftable disc and a hydraulic cylinder for operating the disc, a belt engaged with both pulleys, a hydraulic circuit having a pump for supplying oil, a transmission ratio control valve responsive to engine speed for controlling the oil and for shifting the disc of the primary pulley to change the transmission ratio, and a pressure regulator valve responsive to the transmission ratio for increasing the pressure of the oil with an increase of the transmission ratio. The system further comprises first means for detecting the increase of the engine speed in dependency on the full depression of an accelerator pedal of the vehicle and for producing a signal, and second means responsive to said signal for operating said pressure regulator valve so as to increase the pressure of the oil, whereby the downshifting of the transmission is enhanced.

The other objects and features of this invention will be apparently understood from the following description with reference to the accompanying drawings.

DETAILED DESCRIPTION OF THE PREFERRED EMBODIMENTS

Figure 2:
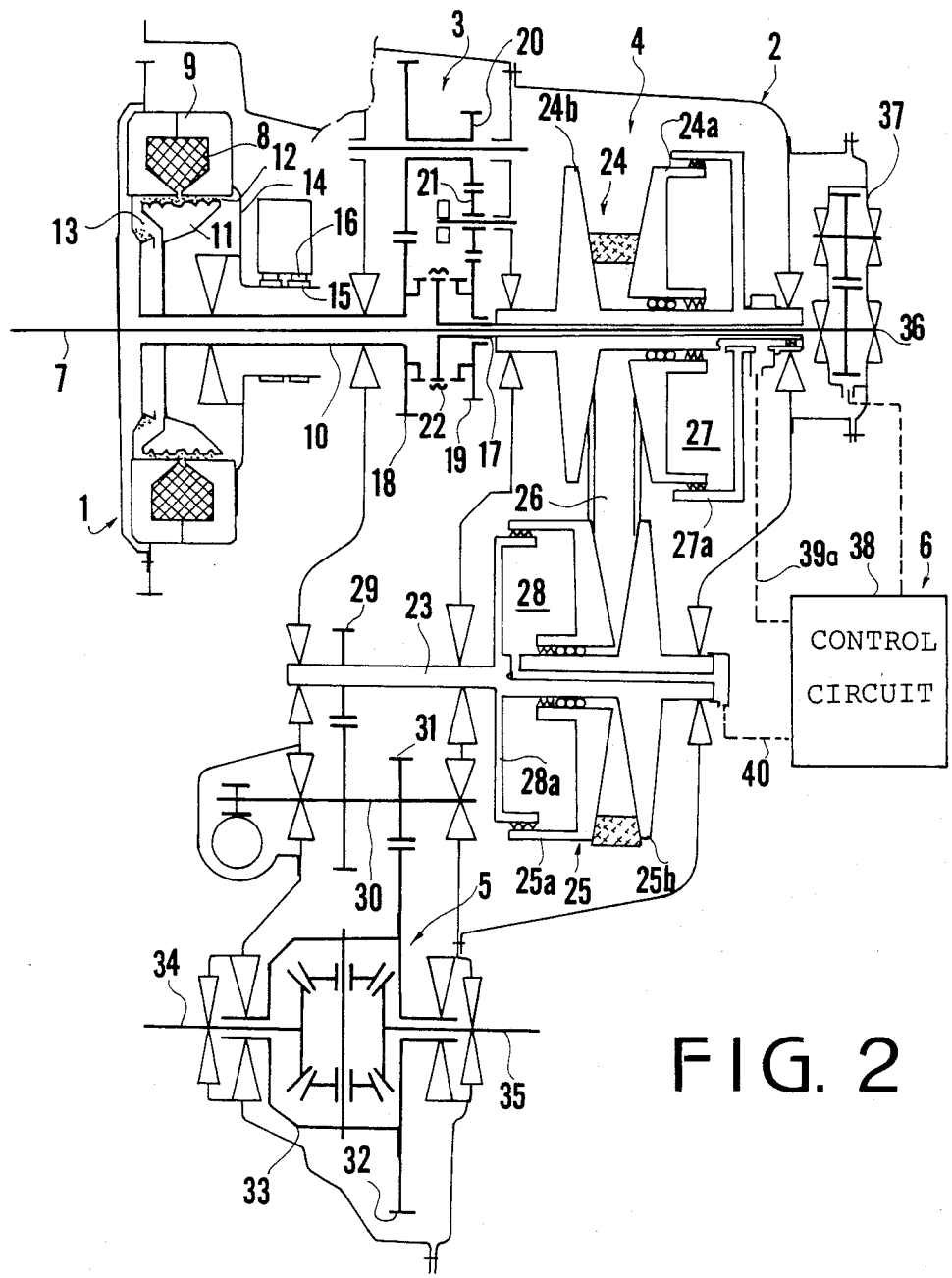
FIG. 2 is a schematic illustration of an infinitely variable belt-drive transmission.

Referring to FIG. 2, the infinitely variable belt-drive automatic transmission for a vehicle to which the present invention is applied, comprises an electromagnetic powder clutch 1, an infinitely variable belt-drive transmission 2, a selector mechanism 3, pulleys and belt device 4, final reduction device 5, and an oil control circuit 6. The crankshaft 7 of an engine (not shown) is connected to an annular drive member 9 of the electromagnetic powder clutch 1. The electromagnetic powder clutch comprises a coil 8 provided in the drive member 9, a driven member 11 having its outer periphery spaced from the inner periphery of the drive member 9 by a gap 12, and a powder chamber 13 defined between the drive member 9 and driven member 11. The powder chamber 13 is filled with magnetic powder. The driven member 11 is secured to an input shaft 10 of the belt-drive transmission. A holder 14 secured to the drive member 9 carries slip rings 15 which are electrically connected to the coil 8. The coil 8 is supplied through brushes 16 and slip rings 15 with control current from an electronic control circuit.

When the magnetizing coil 8 is excited by clutch current, the drive member 9 is magnetized to produce a magnetic flux passing through the driven member 11. The magnetic powder is aggregated in the gap 12 by the magnetic flux and the driven member 11 is engaged with the drive member 9 by the powder. On the other hand, when the clutch current is cut off, the drive and driven members 9 and 11 are disengaged from one another.

In the belt-drive transmission 2, the selector device 3 is provided between the input shaft 10 and a main shaft 17. The main shaft 17 is cylindrical and is disposed coaxially with the input shaft 10. The selector device 3 comprises a drive gear 18 integral with the input shaft 10, reverse driven gear 19 rotatably mounted on the main shaft 17, and a synchronizer 22 mounted on the main shaft 17. The drive gear 18 meshes with one of the gears of a counter gear assembly 20. Another gear of the counter gear assembly 20 engages with an idler gear 21, which in turn engages with the driven gear 19.

The synchronizer 22 has a well known mechanism and comprises a hub secured to the main shaft 17, and a synchronizer sleeve slidably engaged with the hub with splines. The synchronizer sleeve is adapted to engage with splines of the drive gear 18 or with splines of the driven gear 19.

At a neutral position (N range) of a selector lever (not shown), the synchronizer 22 does not engage either gear, so that the main shaft 17 is disconnected from the input shaft 10. When the synchronizer is engaged with the gear 18, the input shaft 10 is connected to the main shaft 17 through the synchronizer to provide a driving position (D range).

When the synchronizer is engaged with the gear 19, the input shaft 10 is connected to the main shaft 17 through gears 18, 20, 21 and 19 to provide a reverse driving position (R range).

The main shaft 17 has an axial passage in which an oil pump driving shaft 36 connected to the crankshaft 7 is mounted. An output shaft 23 is provided in parallel with the main shaft 17. A primary pulley 24 and a secondary pulley 25 are mounted on the shafts 17 and 23 respectively. A fixed conical disc 24b of the primary pulley 24 is integral with the main shaft 17 and an axially movable conical disc 24a is axially slidably mounted on the main shaft 17. The movable conical disc 24a also slides in a cylinder 27a formed on the main shaft 17 to provide a servo device 27. A chamber of the servo device 27 communicates with a gear pump 37 through a passage 39 and a control circuit 38. The gear pump 37 is driven by the shaft 36.

A fixed conical disc 25b of the secondary pulley 25 is formed on the output shaft 23 opposite the movable disc 24a and a movable conical disc 25a is slidably mounted on the shaft 23 opposite the disc 24b. Movable conical disc 25a has a cylindrical portion in which a piston portion 28a of the output shaft 23 is slidably engaged to form a servo device 28. A chamber of the servo device 28 is communicated with the oil pump 37 through a passage 40 and the control circuit 38. A drive belt 26 engages the primary pulley 24 and the secondary pulley 25.

Secured to the output shaft 23 is a drive gear 29 which engages with an intermediate reduction gear on an intermediate shaft 30. An intermediate gear 31 on the shaft 30 engages with a final gear 32. Rotation of the final gear 32 is transmitted to axles 34 and 35 of the vehicle driving wheels through a differential 33.

The pressure oil control circuit 38 is responsive to engine speed and throttle valve position for controlling the pressurized oil supply to the servo devices 27 and 28 thereby moving discs 24a and 25a. Thus, the transmission ratio is infinitely changed.

Figure 3:
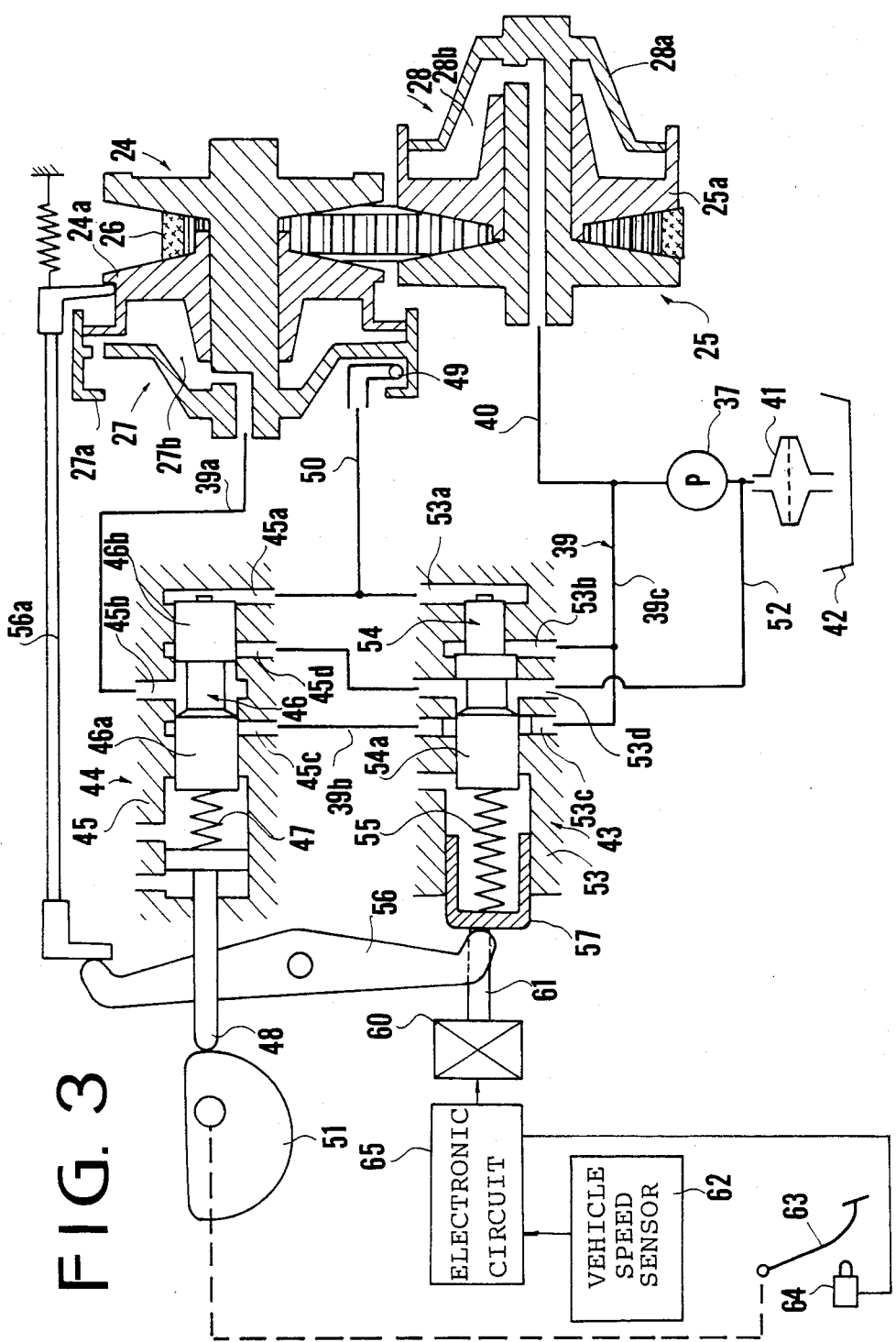
FIG. 3 is a schematic diagram showing a control system according to the present invention.

Referring to FIG. 3, a chamber 27b of the servo device 27 is applied with pressurized oil by the gear pump 37 from an oil reservoir 42 passing through a filter 41, the conduit 39, a pressure regulator valve 43 and a transmission ratio control valve 44. A chamber 28b of the servo device 28 is applied with pressurized oil through the conduit 40 without passing through the valves 43 and 44. The movable conical disc 24a is so designed that its pressure receiving area is larger than that of the movable conical disc 25a.

The transmission ratio control valve 44 comprises a valve body 45, a spool 46, a spring 47 for biasing the spool in the downshift direction, and an actuating member 48 for the spool 46 and the spring 47. The actuating member 48 engages a shift cam 51. The shift cam 51 is operatively connected to an accelerator pedal 63 of the vehicle so as to be rotated in dependency on the magnitude of depression of the pedal 63. A port 45b of the valve 44 is selectively communicated with a pressure oil supply port 45c or a drain port 45d in accordance with the position of lands 46a and 46b of the spool 46. Port 45b communicates with the chamber 27b through a conduit 39a, and the port 45c communicates with the pressure regulator valve 43 through a conduit 39b. The drain port 45d communicates with the oil reservoir 42 through a port 53d and conduit 52. An end chamber 45a of the valve 44 is applied with Pitot pressure from a Pitot pipe 49 through a passage 50.

Thus, the spool 46 is shifted in dependency on the Pitot pressure dependent on the engine speed and on the pressure by the spring 47 dependent on the opening degree of the throttle valve. The amount of oil supplied to the chamber 27b increases with an increase of engine speed and with a decrease of the opening degree of the throttle valve to provide upshifting.

The pressure regulator valve 43 comprises a valve body 53, a spool 54, and a spring 55 for biasing the spool 54 in one direction. The spool 54 is applied with pressure of the pressure oil supplied through the conduit 39 and a port 53b, so that the spool 54 is moved to the left by the oil pressure at the port 53b. One end of the spring 55 engages with a slidable spring retainer 57 which is moved through an arm 56 and rod 56a. The rod 56 engages the disc 24a for detecting the transmission ratio during operation. A port 53c connected with the conduit 39c is communicated with the conduit 39b and selectively communicated with the port 53d in accordance with the position of a land 54a of the spool 54.

An end chamber 53a of the valve 43 is is applied with the Pitot pressure from the Pitot pipe 49. Accordingly, the spool 54 is applied with the Pitot pressure, with the pressure applied to the chamber 28b, and with the pressure of the spring 55 dependent on the transmission ratio. When the engine speed increases, if the force of the pitot pressure on the spool 46 at chamber 45a is greater than that of the spring 47 the rod 56a moves to the right to turn the arm 56 in the clockwise direction. Thus, the spool 54 is shifted to the left to communicate the port 53c with the drain port 53d. Accordingly, the line pressure in line 39 decreases, thereby performing the upshift operation of the transmission. When the accelerator pedal is fully depressed for kickdown, the spool 46 of the valve 44 is shifted to the right by the cam 51, to drain the oil in the chamber 27b, thereby downshifting of the transmission. On the other hand, the spool 54 of the pressure regulator valve 43 is shifted to the right by the increased force of the spring 55 compressed by the arm 56. The full depression of the accelerator pedal 63 also actuates a kickdown switch 64 which causes a push rod 40 to also push the spring retainer 57 and thus the spool 54 to the right. Thus, communication between the ports 53c and 53d is closed to increase the pressure of the oil applied to the chamber 28b of the secondary pulley. Accordingly, the transmission ratio is changed to a low speed range.

In such a system, a kickdown solenoid 60 is provided in accordance with the present invention. An end of the push rod 61 operated by the solenoid is engaged with the spring retainer 57 together with the arm 56. The solenoid 60 is operated by a signal from an electronic circuit 65 responsive to a signal from a vehicle speed sensor 62 and a signal from the kickdown switch 64 which is operated by the accelerator pedal 63 when it is fully depressed.

Figure 4:
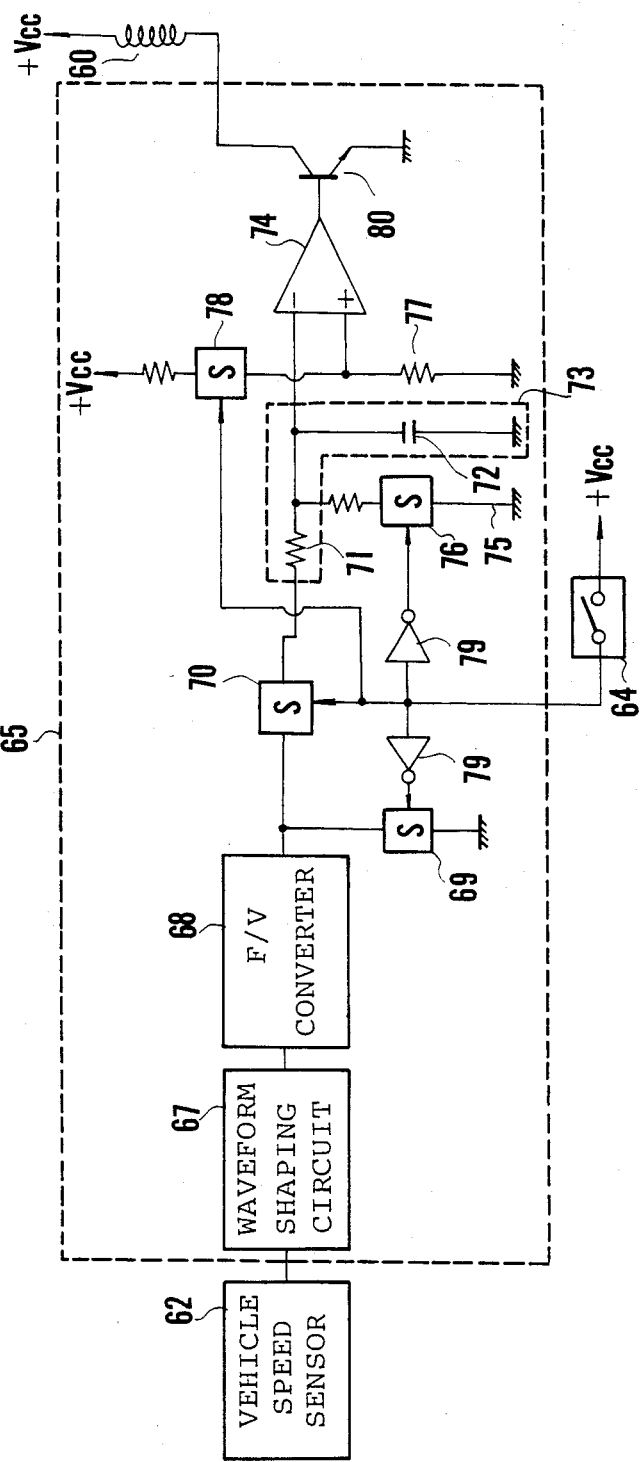
FIG. 4 is an electronic control circuit used in the control system.

Referring to FIG. 4, the output signal of the vehicle speed sensor 62 is shaped by a waveform shaping circuit 67 and converted to a voltage by a frequency-to-voltage (F/V) converter 68. The output terminal of the F/V converter 68 is connected to the ground through an analog switch 69 and to an integrator circuit 73 through an analog switch 70. The integrator circuit 73 comprises a resistor 71 and a capacitor 72, and the output of the integrator is applied to an inverting input of a comparator 74. A discharge circuit 75 having an analog switch 76 is connected in parallel with the capacitor 72. A reference voltage is applied to the non-inverting input of the comparator 74 by a reference voltage circuit 77 including an analog switch 78. The output terminal of the kickdown switch 64 is directly connected to a control gate of each of the analog switches 70 and 78, and connected to a control gate of each of analog switches 69 and 76 through a respective inverter 79. The output of the comparator 74 is applied to a base of a transistor 80 connected in the circuit of the kickdown solenoid 60 in series.

The operation of the circuit is described hereinafter. When the kickdown switch 64 is not closed, the analog switches 70 and 78 are off, so that the output comparator 74 is at low level. Accordingly, the transistor 80 is in the off state and the solenoid 60 is not energized.

When starting the vehicle, the pressure of the spring 47 is higher than the Pitot pressure representative of engine speed. Thus, the spool 46 of the transmission ratio control valve 44 is moved to the right to drain the oil in the chamber 27b. Accordingly, the transmission ratio is at the highest value to provide a low speed range.

After starting of the vehicle, the spool 46 of the valve 44 is shifted to the left as the Pitot pressure increases with increase of the engine speed, so that the oil is supplied to the chamber 27b. Since the pressure receiving area of the movable conical disc 24a is larger than the movable conical disc 25a, the disc 24a moves the belt 26 to increase the belt running diameter on the pulley 24. Accordingly, the rod 56a moves to the right, causing the spool 54 of the valve 43 to move to the left. Thus, the ports 53c and 53d are communicated with each other to decrease the line oil pressure, causing the conical disc 25a to move to the right. Accordingly, the transmission ratio progressively decreases to high speed range.

Figure 1:
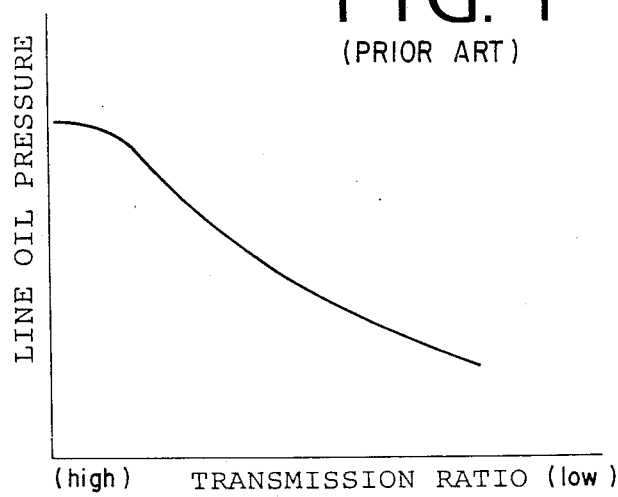
FIG. 1 is a graph showing the relationship between line oil pressure and transmission ratio in a conventional infinitely variable transmission.
Figure 5:
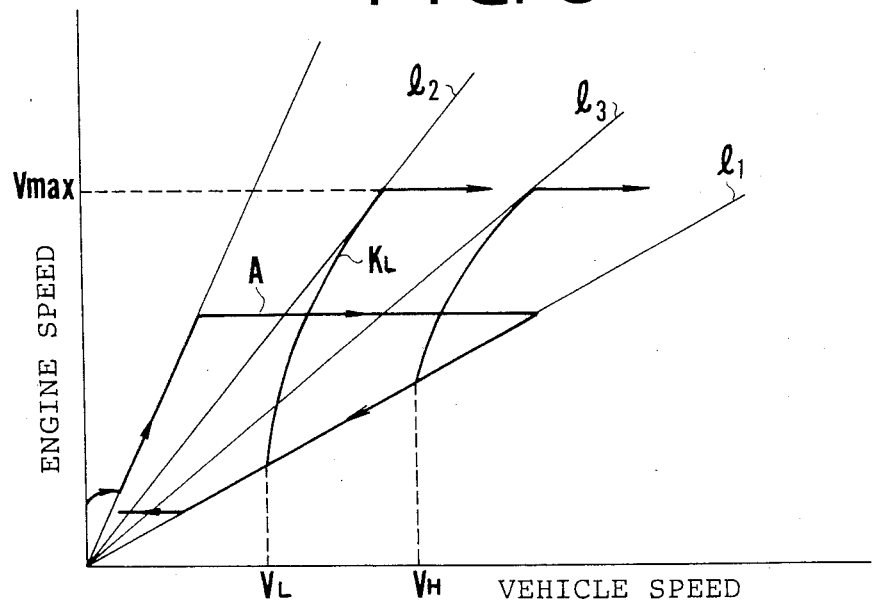
FIG. 5 shows a transmission control characteristic of the infinitely variable transmission.

When the engine speed is decreased for the deceleration of the vehicle, the Pitot pressure decreases. However, the spool 46 of the valve 44 is not shifted to the right, since the pressure of the spring 47 decreases with the decrease of the opening degree of the throttle valve. Thus, the transmission ratio is maintained at a low value (high speed range) and the vehicle speed decreases with the decrease of the engine speed. When the Pitot pressure becomes lower than a predetermined value, the spool 46 is shifted to the right to drain the oil in the chamber 27b. Accordingly, the movable disc 24a moves to the left, so that the transmission ratio progressively increases to low speed range. The rod 56a also moves to the left dependent on the disc 24a to shift the spool 54 of the pressure regulator valve 43. Thus, line pressure increases to enhance the movement of the movable conical disc 25a to the left for establishing the low speed range. Line A in FIG. 5 represents such a variation of the transmission ratio from the start of the vehicle to the deceleration thereof.

When the accelerator pedal 63 is fully depressed for the kickdown at a low vehicle speed VL on the smallest transmission ratio line $l_1$, for example, the spool 46 of the valve 44 is shifted to the right by the depression of the accelerator pedal to drain the oil in the chamber 27b. On the other hand, the kickdown switch 64 is closed to turn on switches 70 and 78 and to turn off switches 69 and 76. Accordingly, voltage dependent on the vehicle speed is charged in the capacitor 72 and the comparator 74 produces an output which turns on the transistor 80. Thus, the kickdown solenoid 60 is excited to project the rod 61 to shift the spool 54 of the pressure regulator valve 43 to the right, so that the line pressure is increased. Accordingly, the transmission is quickly downshifted by the draining of the oil in the chamber 27b and the increasing of the pressure in the chamber 28b.

When the charged voltage in the capacitor 72 exceeds the reference voltage, the output of the comparator 74 goes to a low level to turn off the transistor 80 to de-energize the solenoid 60. Thus, the downshifting of the transmission stops. If the kickdown is operated at the low vehicle speed VL, a long time elapses until the downshifting finishes. Accordingly, as shown in FIG. 5, downshift line KL becomes long and the downshift reaches a sufficiently high transmission ratio line $l_2$. At that time, engine speed reaches a maximum value Vmax. After that, the vehicle speed rapidly increases with a decrease of the transmission ratio.

Figure 6:
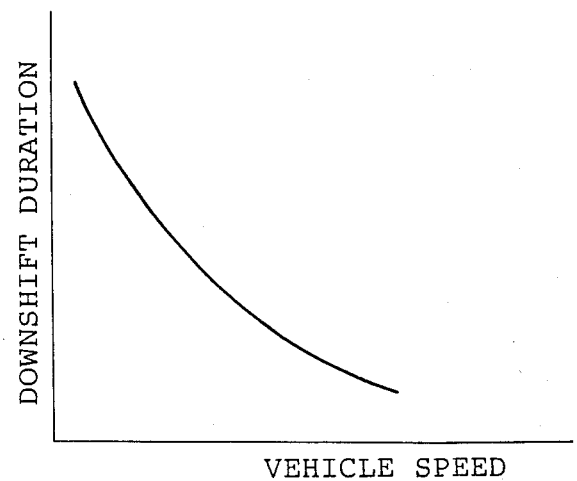
FIG. 6 is a graph showing the relationship between vehicle speed and downshift duration during kickdown.

To the contrary, when the kickdown is operated at a high vehicle speed VH, the period of charging the capacitor 72 is reduced because of the high output voltage of the F/V converter 68, which results in a reduction of the downshift duration. Accordingly, downshifting of the transmission reaches a lower transmission ratio line $l_3$. FIG. 6 shows the relationship between the vehicle speed and the downshift duration.

Figure 7:
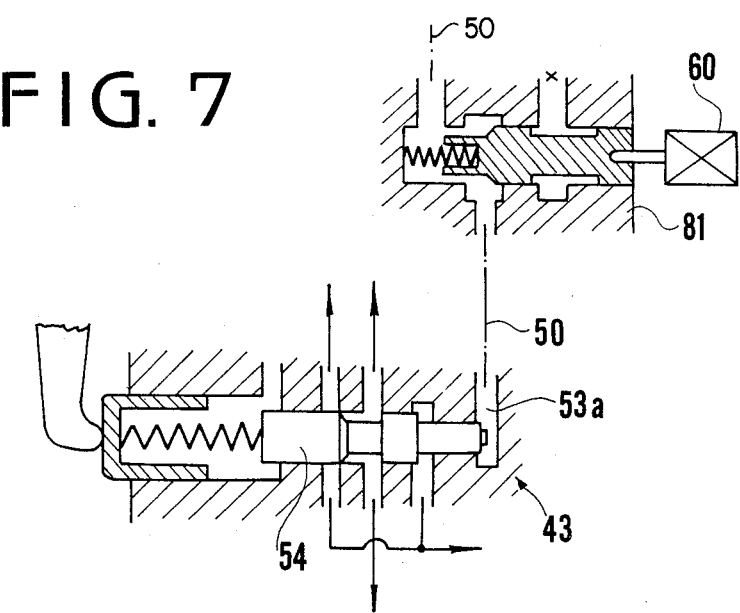
FIG. 7 is a hydraulic circuit in another embodiment of the present invention.

FIG. 7 shows another embodiment for raising the line pressure. In the system, a valve 81 operated by the solenoid 60 is provided in the passage 50.

When the solenoid 60 is energized, the oil in the end chamber 53a is drained to reduce the Pitot pressure, so that the spool 54 moves to the right to increase the pressure of the oil in the chamber 28b.

In the embodiment of FIG. 3, the line pressure due to the pressure regulator valve 43 can be determined by changing the amount of projection of the rod 61. Further, the downshift duration can be determined by the operation of the kickdown switch 64 or by sensing the engine speed.

While the presently preferred embodiments of the present invention has been shown and described, it is to be understood that this disclosure is for the purpose of illustration and that various changes and modifications may be made without departing from the spirit and scope of the invention as set forth in the appended claims.

What is claimed is:

1. In a control system for an infinitely variable transmission for transmitting the power of an internal combustion engine of a vehicle having an accelerator pedal for operating the engine, the transmission comprising a primary pulley having a first hydraulically shiftable disc and a first hydraulic cylinder for shifting the disc, a secondary pulley having a second hydraulically shiftable disc and a second hydraulic cylinder for operating the second disc, and a belt engaged with both pulleys, the system including a hydraulic circuit having a pump for supplying oil, a transmission ratio control valve provided in the hydraulic circuit and having a spool shiftable in accordance with the speed of the engine for controlling the oil supplied to the cylinder for shifting the first disc of the primary pulley to change the transmission ratio of the transmission, and a pressure regulator valve provided in the circuit and having a spool shiftable in accordance with the transmission ratio for increasing the pressure of the oil applied to the cylinders with an increase of the transmission ratio, the improvement comprising a kickdown switch means operative to produce a kickdown signal upon full depression of the accelerator pedal of the vehicle;

electronic circuit means responsive to the kickdown signal for producing a downshift signal for a period of duration;

an electromgnetic means responsive to the downshift signal during its period of duration for shifting the spool of the pressure regulator valve so as to increase the pressure of the oil, whereby downshifting of the transmission is enhanced, speed sensor means for sensing speed of at least part of the vehicle occurring when said accelerator pedal becomes fully depressed, and said electronic circuit means including time determining means responsive to said speed occurring when said accelerator pedal becomes fully depressed sensed by the sensor means for extending said period of duration of said downshift signal with a lower value of said speed occurring when said accelerator pedal becomes fully depressed so as to provide a higher transmission ratio.

2. The system according to claim 1, wherein said speed sensor means is a vehicle speed sensor.

3. The system according to claim 1, wherein said electronic circuit means includes means for changing the duration of said period of duration of said downshift signal depending on a parameter at kickdown.

4. In a control system for an infinitely variable transmission for transmitting the power of an internal combustion engine mounted on a vehicle having an accelerator pedal for operating the engine, the transmission comprising a primary pulley having a first hydraulically shiftable disc and a first hydraulic cylinder for shifting the disc, a secondary pulley having a second hydraulically shiftable disc and a second hydraulic cylinder for operating the second disc, and a belt engaged with both pulleys, the system including a hydraulic circuit having a pump for supplying oil, a transmission ratio control valve provided in the hydraulic circuit and having a spool shiftable in accordance with the speed of the engine for controlling the oil supplied to the cylinder for shifting the first disc of the primary pulley to change the transmission ratio of the transmission, and a pressure regulator valve provided in the circuit and having a spool shiftable in accordance with the transmission ratio for increasing the pressure of the oil applied to the cylinders with an increase of the transmission ratio, the improvement comprising a kickdown switch means operative to produce a kickdown signal upon full depression of the accelerator pedal of the vehicle;

electronic circuit means responsive to the kickdown signal for producing a downshift signal for a period of duration:

an electromagnetic means responsive to the downshift signal during its period of duration for shifting the spool of the pressure regulator valve so as to increase the pressure of the oil, whereby downshifting of the transmission is enhanced;

said electronic circuit means includes means for changing the duration of said period of duration of said downshift signal depending on a parameter at kickdown.

5. The system according to claim 4, wherein said changing means includes an integrator including a chargeable capacitor for storing thereon an accmmulating value of said parameter, and a comparator means for comparing the output of said integrator with a reference value for operating said electromagnetic means until said output reaches said reference value.

6. The system according to claim 5, wherein said electronic circuit means includes first and second switches actuated by operation of said kickdown switch means for providing said reference value and connecting said electronic circuit means in operation, respectively.

7. The system according to claim 6, wherein said electronic circuit means further includes a third switch connected to ground and in parallel with said capacitor and a fourth switch grounding said electronic circuit means, operation of kickdown switch means for disconnecting said third and fourth switches.

8. The system according to claim 6, further comprising a speed sensor, said electronic circuit means includes a F/V converter connected to said second switch and a waveform shaping circuit connected to said F/V converter and to said speed sensor.

* * * * *